(12) United States Patent
Hirsch

(10) Patent No.: US 8,447,233 B2
(45) Date of Patent: May 21, 2013

(54) DEVICE WITH AN EEPROM HAVING BOTH A NEAR FIELD COMMUNICATION INTERFACE AND A SECOND INTERFACE

(75) Inventor: Olaf Hirsch, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/597,182

(22) Filed: Aug. 28, 2012

(65) Prior Publication Data

US 2012/0322375 A1  Dec. 20, 2012

Related U.S. Application Data

(63) Continuation of application No. 12/377,616, filed as application No. PCT/IB2007/004647 on Aug. 15, 2007, now Pat. No. 8,280,304.

(60) Provisional application No. 60/838,103, filed on Aug. 15, 2006.

(51) Int. Cl.
*H04B 5/00* (2006.01)

(52) U.S. Cl.
USPC ........................................................ 455/41.1

(58) Field of Classification Search
USPC ........................................................ 455/41.1
See application file for complete search history.

(56) References Cited

U.S. PATENT DOCUMENTS

| | | | |
|---|---|---|---|
| 4,310,901 A | 1/1982 | Harding et al. | |
| 5,513,334 A | 4/1996 | Alexander | |
| 6,170,059 B1 | 1/2001 | Pruett et al. | |
| 6,993,319 B2 | 1/2006 | Himmel et al. | |
| 2004/0064612 A1 | 4/2004 | Pinto et al. | |
| 2004/0176032 A1* | 9/2004 | Kotola et al. | 455/41.2 |

FOREIGN PATENT DOCUMENTS

| | | |
|---|---|---|
| EP | 1 237 333 A1 | 9/2002 |
| EP | 1 408 650 A1 | 4/2004 |
| WO | 01/45319 A1 | 6/2001 |
| WO | 03/081787 A2 | 10/2003 |

OTHER PUBLICATIONS

"Contactless Single-trip Ticket IC MF0 IC U1" Philips Semiconductors, 22 pgs, retrieved from the internet at: www.wontec.com.tw/images/jpg/IC/ultralight.pdf (Mar. 2003).

"Near Field Communication White Paper", ECMA International, 9 pgs, retrieved from the Internet at: www.ecma-international.org/.../Communications/2004tg19-001.pdf (Feb. 12, 2004).

International Search Report for Int'l Patent Application No. PCT/IB2007/004647 (May 28, 2009).

* cited by examiner

*Primary Examiner* — Daniel Rojas

(57) ABSTRACT

A peripheral device and a method for programming the read/writeable memory of the RFID circuitry by communications between either RF antenna or bus communications port controller interface or both. In the peripheral device, an EEPROM, bus communications controller interface, NFC interface, antenna, and logic controller operate to receive and transmit configuration and calibration data between a BLUETOOTH circuit and an external BLUETOOTH enabled device. The dual interfaced EEPROM is operable to share or partition its EEPROM between an NFC interface and a bus communications controller.

10 Claims, 3 Drawing Sheets

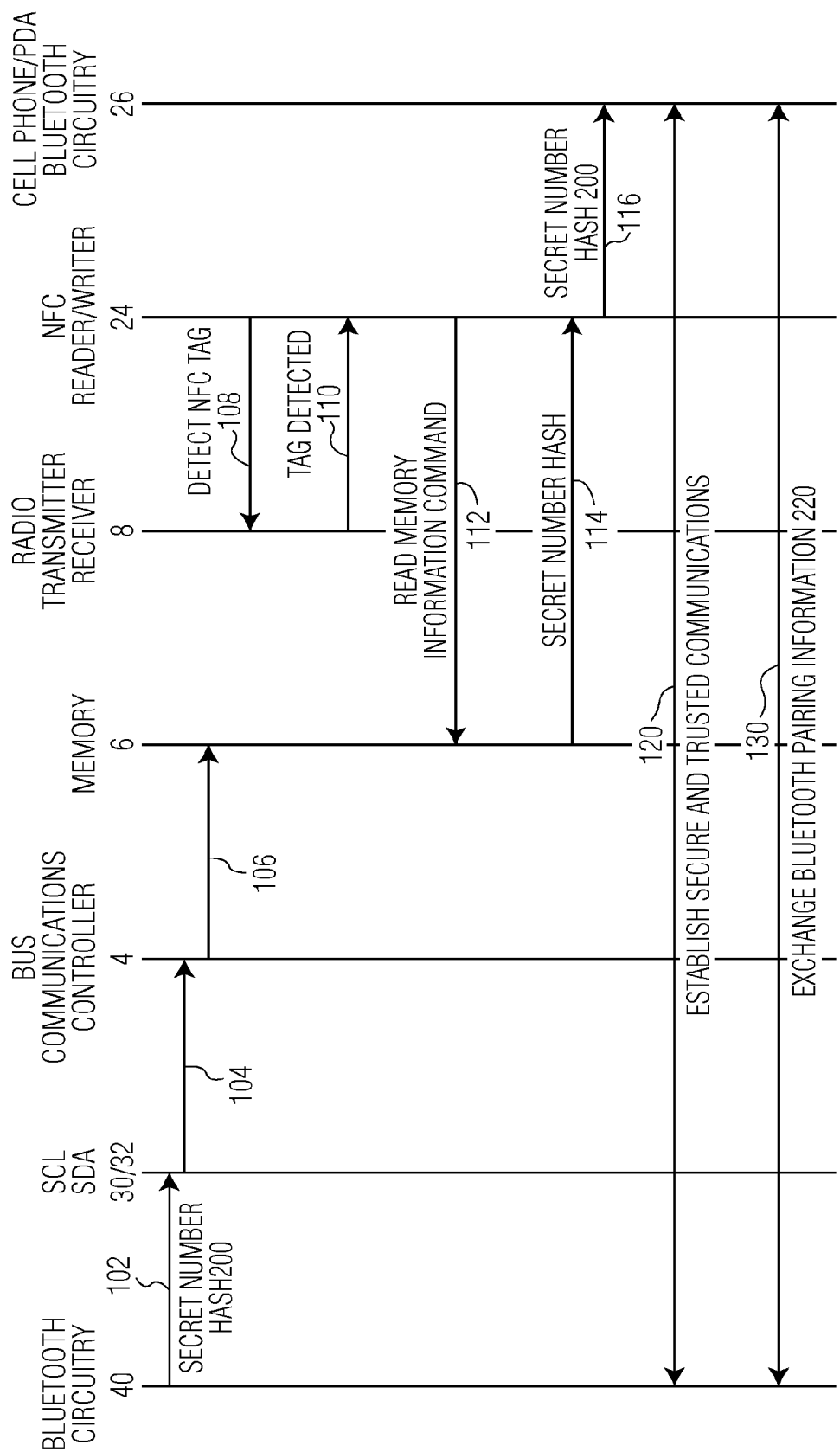

A NEAR FIELD COMMUNICATION
INTERFACE AND A SECOND INTERFACE

This application is a Continuation of U.S. application Ser. No. 12/377616 filed Feb. 16, 2009, entitled "DEVICE WITH AN EEPROM HAVING BOTH A NEAR FIELD COMMUNICATION INTERFACE AND A SECOND INTERFACE" which claims priority to provisional U.S. 60/838103 filed Aug. 15, 2006 and PCT application No. IB2007/004647 filed Aug. 15, 2007.

BACKGROUND OF THE INVENTION

The present invention relates generally to the electronic communication between electronic components. More specifically, embodiments of the present invention are related to systems that use Near Field Communication (NFC) or other smart card technology along with an EEPROM to store system configuration data.

In recent years there has been a significant increase in the amount and use of mobile devices such as cell phones and personal data assistants (PDA's). This trend is expected to continue as more consumers become more driven to maintain personal communications as they transit to and from various locations. The demand to be more mobile and not weighed by cumbersome instruments is placing demands on the communications industry to produce smaller, cheaper, and more easy to use devices.

Previously, peripheral devices were connected to the host device through a communications cable. BLUETOOTH technology replaced the cables and maintained the requisite level of data security. Generally, a BLUETOOTH enabled peripheral device can connect to other BLUETOOTH enabled devices in its proximity. These devices connect through a synchronized short range network known as a piconet. Each device may communicate with up to seven separate devices within a piconet. Each BLUETOOTH enabled device may also belong to several separate piconets simultaneously. Once a BLUETOOTH enabled device is synchronized within its piconet network, the device that provides the synchronization is referred to as the master and all the other devices within the piconet are referred to as the slaves.

BLUETOOTH mobile peripheral devices have been developed to enable consumers to utilize their mobile phones, BLUETOOTH enabled PDA's, and mobile computer devices (hereinafter "mobile device") without a cumbersome cable tethering one device to another. Peripheral devices, such as BLUETOOTH enabled headsets are convenient, but must be authenticated with a single mobile device to form the piconet there between. This process of authentication is also known as pairing.

Presently, pairing is accomplished by the user manually entering the PIN of the BLUETOOTH enabled headset into the mobile device. After entering the PIN, the two devices exchange configuration information such as the link key. The headset stores the configuration data in an Electronically Erasable Programmable Read Only Memory (EEPROM) and utilizes this data to re-authenticate with the mobile device. This process of manual pairing by the user enables the mobile device to find the headset, connect to it wirelessly, authenticate the headset, and then encrypt the link. The consumer cannot effectively pair or program a BLUETOOTH peripheral headset or other BLUETOOTH peripheral device (ex. Printer audio device, or other mobile device etc.,) via any other mechanism than with the manual process of the user inputting information required to establish the pairing. Such a manual process is cumbersome and potentially prone to user's mistakes and to third party security attacks.

SUMMARY OF THE INVENTION

In addition to the authentication that is stored in the EEPROM, a Blue tooth peripheral device such as a BLUETOOTH headset needs to store additional information such as calibration information or SW patches. This additional information is usually programmed into the EEPROM during the manufacturing process.

Exemplary embodiments of the present invention provide a device and method for storing data received from Radio Frequency (RF) or hard wired connections and a method for programming an electronically erasable read only memory with either RF received data, from hard wired transferred data or from both. An exemplary device includes circuitry that transmits and receives data to and from an onboard electronically erasable memory via a passive NFC transceiver. The exemplary device further includes a communications controller associated with the electronically erasable memory that communicates with a BLUETOOTH enabled device. A passive NFC transceiver is a tag that is not able to initiate communication by itself, but instead needs an active NFC reader/writer device to initiate communication.

An exemplary method includes providing a single EEPROM that can receive configuration data via NFC and then allow a BLUETOOTH enabled device to use the configuration data to enable the BLUETOOTH communication connection with another BLUETOOTH enabled device.

BRIEF DESCRIPTION OF THE DRAWINGS

A more complete understanding of the method and apparatus of the present invention may be obtained by reference to the following Detailed Description when taken in conjunction with the accompanying Drawing wherein:

FIG. 3 is an exemplary flow chart diagram of the communications path for the information to be conveyed from a mobile device to the peripheral device.

DETAILED DESCRIPTION OF THE EXEMPLARY EMBODIMENTS OF THE INVENTION

Embodiments of the present invention utilize NFC or other smart card technology to obtain authentication information and then use an EEPROM to store the obtained authentication information. The EEPROM can then provide the authentication information to associated BLUETOOTH circuitry therefore enabling pairing with another BLUETOOTH enabled device. Embodiments of the present invention may include BLUETOOTH headsets that contain a passive radio frequency identification (RFID) tag. A RFID tag contains an internal read/writeable memory, an antenna, and additional circuitry that enables the RFID tag to receive and respond to radio frequencies. The RFID tag and the BLUETOOTH headset circuitry are combined such that they share a common EEPROM memory.

BLUETOOTH is an industrial specification for wireless personal area networks (PANs), also know as IEEE 802.15.1. BLUETOOTH provides a way to connect and exchange information between devices like personal digital assistants (PDAs), mobile phones, laptops, PCs, printers, digital cameras, appliances, video game consoles, and other electronic devices via a secure, globally unlicensed short rang radio frequency. Such devices may be referred to as wireless personal area network enabled devices or peripheral devices. It is understood that other wireless personal area network communication specifications, besides BLUETOOTH, may be used in embodiments of the invention. Furthermore, specific details of specific circuitry in exemplary device, other than detail for embodiments of the invention that would be contained, for example, in a mobile phone headset for a personal area network, are included in the figures because such features are readily known by one of ordinary skill in and/or will clutter the Figures. For example, headphone, or printer circuitry is not specifically depicted in FIG. 1.

Figure 1:
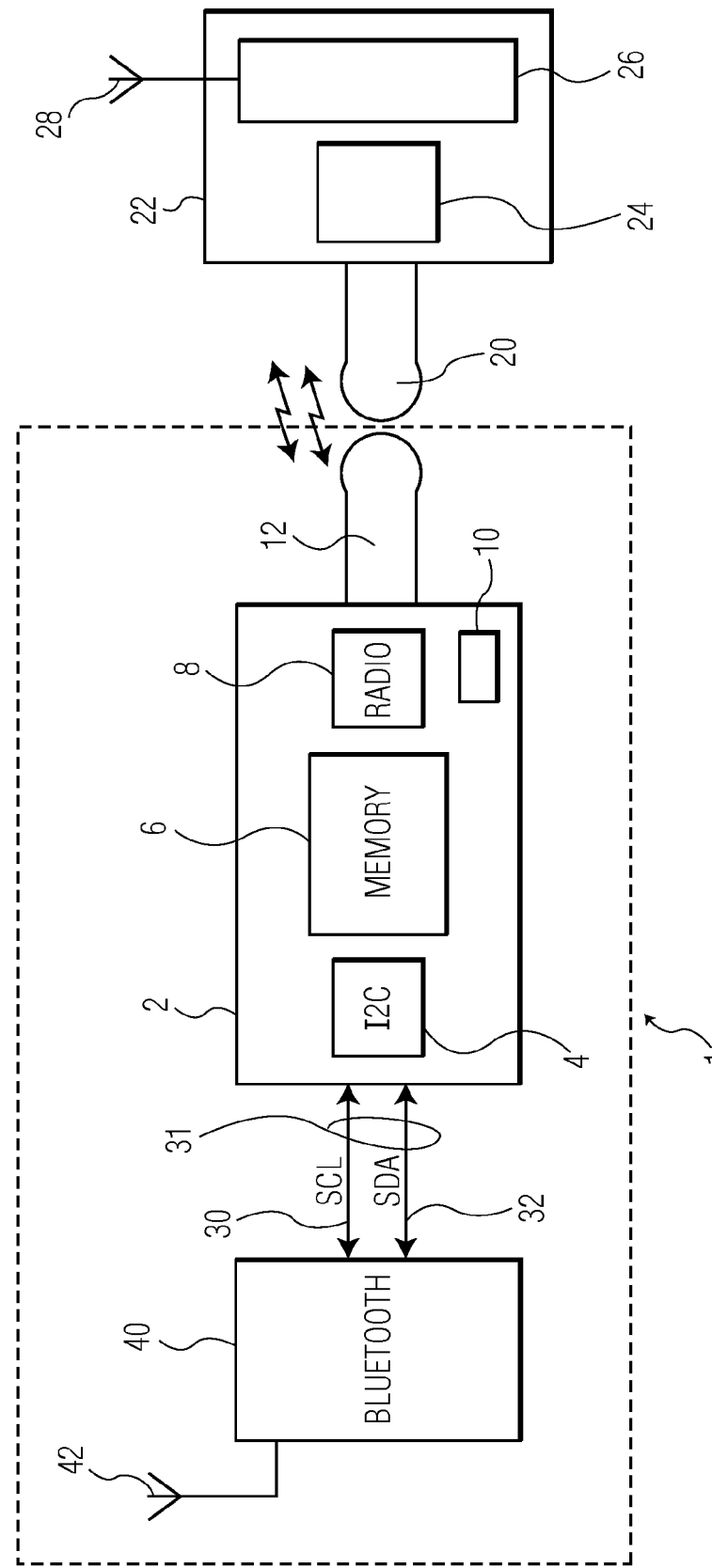
FIG. 1 is a diagram of a peripheral device in accordance with an embodiment of the present invention.

Referring to FIG. 1, an exemplary block diagram of a peripheral BLUETOOTH enabled device 1 is shown. A dual interfaced EEPROM 2 is provided having an NFC or RFID interface 8 that may communicate with an external device 22 via antenna 12.

The external device 22 may be a mobile device or other device that includes an NFC or RFID reader/writer 24 that can send data or other information via antenna 20 to an exemplary BLUETOOTH enabled device 1 via antenna 12. The antennas 12 and 20, in accordance with embodiments of the invention, must be near each other in order to communicate. A distance between 0 to 10 centimeters is necessary for proper communication between antennas 12, 20.

The external device 22 provides authentication data for the peripheral BLUETOOTH enabled device 1. The authentication data is received via an RF signal 3 by antenna 12, and provided to the NFC interface/RFID interface 8. The NFC interface/RFID interface (hereinafter "NFC interface") 8 stores the authentication data in the EEPROM 6 in predetermined memory locations. An exemplary NFC interface 8 receives and sends signals and information in accordance with ISO/IED 14443 or a derivation thereof A logic controller 10 acts as one of the EEPROM's interfaces. The logic controller 10 acts as a command interpreter that handles commands used to access the EEPROM 6 and for providing anti-collision control. The anti-collision control is based on an IC's individual serial number called a Unique Identification (UID) which may be 7 bytes long and supports cascade level 2 in accordance with ISO/IEC 14443-3 or a derivation thereof. Other length UID's may also be used.

The exemplary dual interfaced EEPROM 2 can share its EEPROM 6 through both the NFC interface 8 and the bus communications controller interface 4. The bus communications controller 4 may be an I2C or other serial port interface. The bus communications controller 4 allows the EEPROM to be used by electronic circuitry such as the BLUETOOTH circuitry found in a BLUETOOTH enabled device. The EEPROM 6 can be accessed by an external device 22, via antenna 12, NFC 8 and interface 10, in order to and obtain store authentication data or other semi-permanent data.

The EEPROM 6 can be sub-divided such that parts of the EEPROM 6 can only be written to or read by the bus communications controller interface 4, the NFC interface 8 or both. The partition information can be programmable through any of the interfaces 4, 8 and made permanent by the programming of a specific bit, blowing a fuse or other known method.

One exemplary memory map for the EEPROM 6 is shown in Table 1. The exemplary dual interfaced EEPROM 2 has 512 bits organized in 16 pages with 4 bytes per page. The first 80 bits are reserved for manufacturer data comprising the unique (UID) 7 byte serial number (SN0, SN1, SN2, SN3, SN4, and SN5) its two check bytes (BCC0 and BCC1) and a byte reserved for internal data (Internal). The next 16 bits are used for a read only locking mechanism (Lock0 and Lock1) that locks each page from 3 to 15 individually to prevent further write access. The next 32 bits, page 3, are available as a one time programmable (OTP) area. The final 384 bits are user programmable read/write memory. The OTP and first page of read/write memory can be programmed with the Address and Configuration data. The EEPROM, in an exemplary embodiment, may be memory mapped in various different ways and be larger than 512 bits. In fact it is reasonable for the EEPROM to have from 256 to about 4 Giga bits of memory space. As technology advances, the memory size may also increase.

TABLE 1

An Exemplary Memory Map

| | Byte Number | | | | |
|---|---|---|---|---|---|
| | 0 | 1 | 2 | 3 | Page |
| Serial Number | SN0 | SN1 | SN2 | BCC0 | 0 |
| Serial Number | SN3 | SN4 | SN5 | SN6 | 1 |
| Internal/Lock | BCC1 | Internal | Lock0 | Lock1 | 2 |
| Address | External | External | External | External | 3 |
| Config | Start0 | Start1 | End0 | End1 | |
| Address | Internal | Internal | Internal | Internal | 4 |
| Config | Start0 | Start1 | End0 | End1 | |
| Data Read/Write | Data0 | Data1 | Data2 | Data3 | 5 |
| ... | ... | ... | ... | ... | ... |
| Data Read/Write | DataN − 3 | DataN − 2 | DataN − 1 | DataN | |

The dual interfaced EEPROM 2 is provided having a bus communications controller interface 4 that may communicate with a BLUETOOTH circuit 40 via a serial data bus 31. If the serial data bus is an I2C bus then a serial clock line (hereinafter "SCL") 30 and serial data line (hereinafter "SDA") 32 may be used. The BLUETOOTH circuit 40 provides a secret number hash 200 to the EEPROM 6 of the dual interfaced EEPROM 2. The secret number hash 200 is received via the data bus 31 by bus communications controller interface 4. The bus communications controller interface 4 writes the secret number hash 200 to the EEPROM 6 in one or more predetermined memory locations. The bus communications controller interface 4 receives and sends signals and information between the EEPROM 6 and BLUETOOTH circuit 40.

The dual interfaced EEPROM 2 can also transmit data through the NFC interface 8 to an external device 22 or transmit configuration data through the bus communications controller interface 4 via data bus 31 to the BLUETOOTH circuit 40. This two-way communication capability allows an exemplary peripheral BLUETOOTH enabled device 1 having the exemplary dual interfaced EEPROM 2 to be configured or paired through the antenna 42 or through the antenna 12. The dual interfaced EEPROM 2 can also be configured to notify BLUETOOTH circuit 40 when new or additional configuration data is received from the NFC interface 8. This two-way communication capability allows a peripheral BLUETOOTH enabled device 1 with a dual interfaced EEPROM 2 to use the EEPROM 6 to store BLUETOOTH configuration data and be paired to the external device 22 through the NFC 8 related antenna 12 from the external device antenna 20 or perhaps through the BLUETOOTH antenna 42 via the external device BLUETOOTH antenna 28.

Embodiments of the present invention that provide the addition of non-active NFC to a device or application can be done with a small, incremental cost. A BLUETOOTH peripheral device, such as a BLUETOOTH headset for use with any type of BLUETOOTH enabled phone or communications device, could store configuration data or pairing information from the BLUETOOTH antenna 42 or via an NFC option utilizing the RF antenna 12 using the exemplary dual interfaced EEPROM 2. A BLUETOOTH headset comprises at lease one earphone and a microphone allowing a user to both hear and speak to another party using a communication device.

Figure 2:
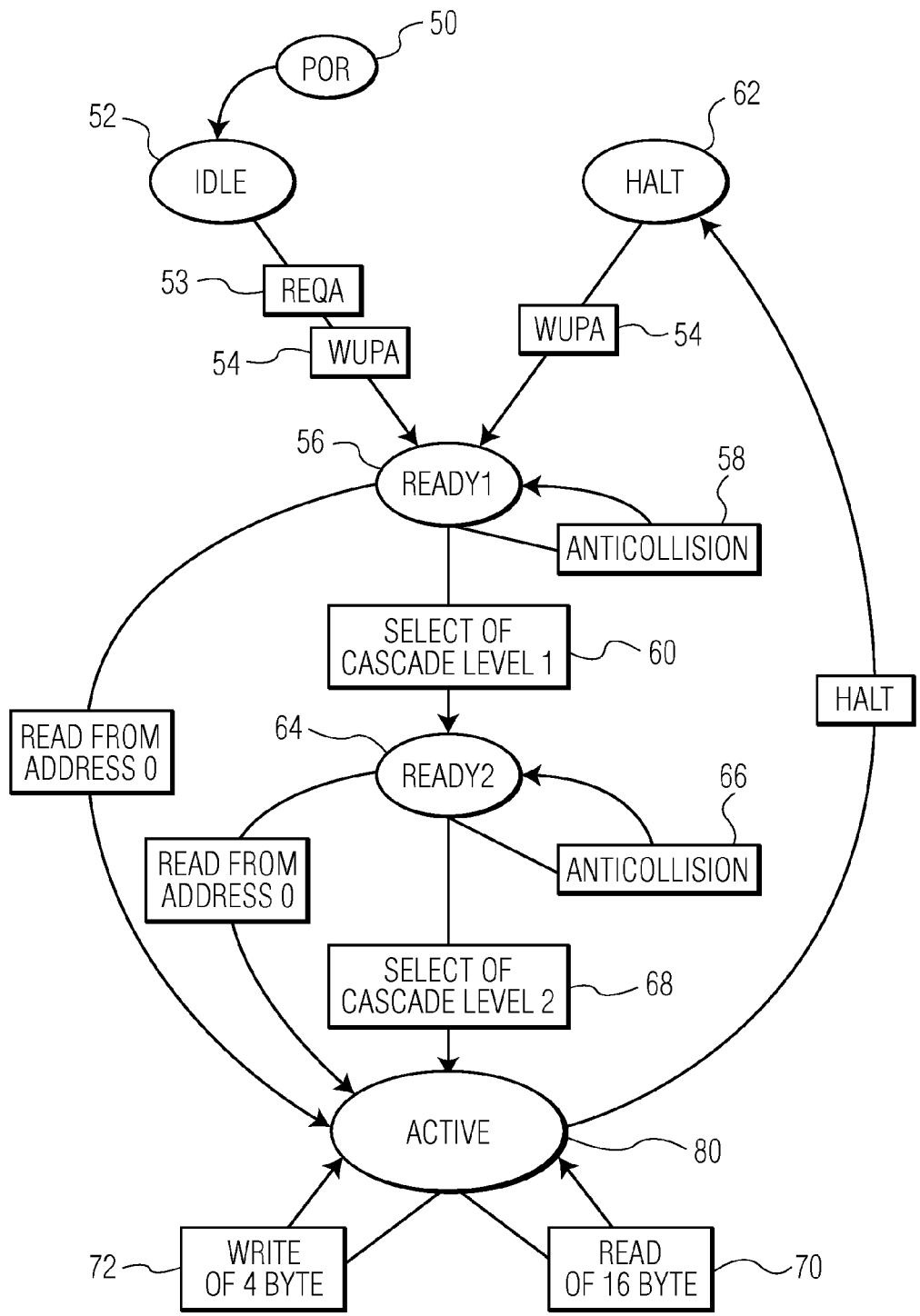
FIG. 2 is an exemplary state diagram of the communications commands for the information to be conveyed from a mobile device to a peripheral device via NFC.

With the dual interfaced EEPROM 2, the devices 1 and 22 can share the necessary authentication data through a process known in the exemplary invention as simple pairing. Simple pairing is when the two devices 1 and 22 perform a pairing process without a user being required to manually enter or select pairing configuration data. Simple pairing is initiated with a device discovery process. As shown by an exemplary state diagram in FIG. 2, the external device 22 initiates a command and the dual interfaced EEPROM 2 generates the appropriate response. When initiated by the external device 22, the Power On Reset (POR) 50 sets the system to idle 52. A request (REQA) command 53 or a wakeup (WUPA) command 54 sent from the external device 22 moves the dual interfaced EEPROM 2 to the Ready1 state 56. Here the dual interfaced EEPROM 2 resolves the first part of its UID (3 bytes) with the anti-collision 58 or a SELECT command 60 of cascade level 1. Any other data received in state Ready1 56 is interpreted as an error and the dual interfaced EEPROM 2 jumps to its waiting state (IDLE 52 or HALT 62, depending on its previous state). Otherwise, with the SELECT command 60, the external device 22 brings the dual interfaced EEPROM 2 into state Ready2 64. In this Ready2 state 64, the dual interfaced EEPROM 2 resolves the second part of its UID (4 bytes) with the Anti-collision command 66 of cascade level 2. It leaves this Ready2 state 64 with a Select command 68 of cascade level 2 from external device 22. The response of the dual interface EEPROM 2 to the Select command of cascade level 2 is the Select Acknowledge (SAK) byte. This byte indicates whether the anti-collision cascade 66 procedure is finished. Now the dual interfaced EEPROM 2 is singularly selected and only this device 1 will communicate with the external device 22 even if other NFC devices are in the field of the external device 22. The device 1 is the active state 80 and, now a READ 70 or WRITE 72 command can be performed. The BLUETOOTH Address and configuration data of the peripheral BLUETOOTH enabled device 1 can now be communicated to the external device 22 along with the secret number hash 200 as shown in FIG. 3.

Referring now to FIGS. 1 and 3, there is an exemplary flow chart diagram of the data flow through the dual interfaced EEPROM 2 is depicted. The BLUETOOTH circuit 40 sends a secret number hash 200 through the serial data bus 31 at step 102. The secret number hash 200 is then transferred at step 104 to the bus communications controller interface 4; then at step 106 to the EEPROM 6. When a user places the external device 22 within about 10 centimeters of the peripheral BLUETOOTH enabled device 1, simple pairing is initiated. The NFC or RFID reader/writer 24 sends a Detect NFC TAG command at step 108 to the NFC interface 8. The NFC interface 8 subsequently sends a TAG Detected signal at step 110 to the NFC or RFID reader/writer 24. The user is prompted as to whether they would like to pair the peripheral BLUETOOTH enabled device 1. If the user responds through the user interface (not shown) that a pairing is desired, then the NFC or RFID reader/writer 24 sends a Read Memory Information command at step 112 to the EEPROM 6. At step 114, secret number hash 200 is then sent to the NFC or RFID reader/writer 24 and, subsequently, to the external device 22 BLUETOOTH circuit 26 at step 116. Once the external device 22 BLUETOOTH circuit 26 has the secret number hash 200, it can establish secure and trusted communications with the BLUETOOTH circuit 40 through antennas 28, 42 at step 120 and exchange the necessary pairing information 220 at step 130.

Embodiments of the present invention do not require manual programming of the BLUETOOTH configuration data. Instead, the embodiments can be simply paired via a NFC wireless link. Thus, a user's experience differs from the previous manually programmed BLUETOOTH paired devices. With embodiments of the present invention, the user is only required to place the external device 22, such as a cell phone, and a peripheral BLUETOOTH enabled device 1, such as a BLUETOOTH headset, into a pairing mode. The external device 22 and a peripheral BLUETOOTH enabled device 1 can be placed in a pairing mode in a number of ways including, but not limited to, a button press or user interface command on both devices, and then moving the devices into near proximity or touching the devices to within about 10 centimeters of each other. Another example would be when a user touches the two devices together such that the NFC related antennas 20 and 12 of the external device 22 and the peripheral BLUETOOTH enabled device 1 are close or proximate to each other. The user may then be asked, via a user interface, whether he/she wishes to pair the peripheral BLUETOOTH enabled device 1 with external device 22. If the user indicates, via the user interface, that a pairing is desired, then an exemplary pairing method is performed without requiring manual entry of pairing data from the user. This is can be a single touch or voice command experience by the user. At the beginning, the external device 22 uses the BLUETOOTH address provided by the peripheral BLUETOOTH enabled device 1 to establish the communication connection while the other data exchanged and stored in the EEPROM 6 are used during authentication. Since NFC communicates at about 10 centimeters or less, this exemplary system and method creates a high security condition that minimizes chance of a third party attack.

Additional embodiments of the present invention include utilization of a Serial Peripheral Interface (SPI) or a parallel interface in the place of the I2C for the bus communications controller interface 4. Additionally, the BLUETOOTH circuit 40 communicating to the bus communications controller interface 4 can be substantially any microcontroller that uses and associated or external electronically erasable or flash memory. Such a microcontroller may be included in an electronic device such as, but not limited to, wireless LAN, a PDA, and electronic toy or gaming device, audio or video device, lock/security system peripheral device, or various secure door mechanism, commercial or industrial applications utilizing microcontrollers and requiring secure data transfer. Furthermore, the dual interfaced EEPROM 2 can be used to replace a more expensive NFC Device when there is a need for shared memory and communication.

Many variations and embodiments of the above-described invention and method are possible. Although only certain embodiments of the invention and method have been illustrated in the accompanying drawings and described in the foregoing Detailed Description, it will be understood that the invention is not limited to the embodiments disclosed, but is capable of additional rearrangements, modifications and substitutions without departing from the invention as set forth and defined by the following claims. Accordingly, it should be understood that the scope of the present invention encompasses all such arrangements and is solely limited by the claims as follows:

The invention claimed is:

1. A peripheral device comprising:
a memory wherein the memory is dual interfaced such that a bus communications controller interface and a passive NFC interface can both be used by the memory to transmit data;
an NFC antenna, connected to said passive NFC interface, for communicating NFC signals with an external BLUETOOTH enabled device; and
a BLUETOOTH circuit in data communication with the bus communications controller interface
wherein the NFC interface is operable to be used for pairing the device with the external BLUETOOTH enabled device via a NFC link and to receive authentication information from the NFC interface, wherein the peripheral device is operable to store the authentication information in the memory, and
the peripheral device is operable to establish a BLUETOOTH connection to the external BLUETOOTH device using the authentication information without any manual entry of pairing data by a user.

2. The device of claim 1, wherein the memory is an electronically erasable programmable read only memory (EEPROM).

3. The device of claim 1, wherein the external BLUETOOTH enabled device is a mobile communication device.

4. The device of claim 1 further comprising a logic controller, wherein the logic controller is operable as an interface between the BLUETOOTH circuit and the memory to handle commands used to access the memory and to provide anti-collision control.

5. The device of claim 2 wherein the EEPROM may be subdivided into parts such that some parts may only be written to or read by the NFC interface.

6. The device of claim 1 further comprising an antenna connected to the BLUETOOTH circuit for communication with the external BLUETOOTH enabled device such that the peripheral device is adapted to be paired or configured through the antenna or through the NFC antenna.

7. A system comprising the peripheral device of claim 1 and the external BLUETOOTH enabled device, wherein the peripheral device and the external BLUETOOTH enabled device are operable to communicate with each other using BLUETOOTH and NFC.

8. The system of claim 7 where the peripheral device is selected from the group consisting of a personal digital assistant, a mobile phone, a laptop computer, a personal computer, a printer, a digital camera, an appliance and video game console.

9. A BLUETOOTH communication headset comprising:
a memory;
two interfaces wherein a first interface is a passive near field communication (NFC) interface and a second interface is a bus communications controller interface;
an NFC antenna, connected to said passive NFC interface, for communicating NFC signals with an external BLUETOOTH enabled device; and
a BLUETOOTH circuit in data communication with the bus communications controller interface
wherein the NFC interface is operable to be used for pairing the device with the external BLUETOOTH enabled device via a NFC link and to receive authentication information from the NFC interface, wherein the BLUETOOTH communication headset is operable to store the authentication information in the memory, and
the BLUETOOTH communication headset is operable to establish a BLUETOOTH connection to the external BLUETOOTH device using the authentication information without any manual entry of pairing data by a user.

10. A peripheral device comprising:
an electronically erasable programmable read only memory (EEPROM);
two interfaces wherein a first interface is a passive near field communication (NFC) interface and a second interface is a bus communications controller interface;
an NFC antenna, connected to said passive NFC interface, for communicating NFC signals with an external BLUETOOTH enabled device; and
a BLUETOOTH circuit in data communication with the bus communications controller interface;
a logic controller, wherein the logic controller is operable as an interface between the BLUETOOTH circuit and the EEPROM to handle commands used to access the EEPROM and to provide anti-collision control;
wherein the anti-collision control is based on an integrated circuit's individual serial number,
wherein the NFC interface is operable to be used for pairing the device with the external BLUETOOTH enabled device via a NFC link and to receive authentication information from the NFC interface, wherein the peripheral device is operable to store the authentication information in the memory, and
the peripheral device is operable to establish a BLUETOOTH connection to the external BLUETOOTH device using the authentication information without any manual entry of pairing data by a user.

* * * * *